United States Patent [19]
South

[11] Patent Number: 5,855,708
[45] Date of Patent: Jan. 5, 1999

[54] SPONGE-COVERED ASSEMBLIES AND METHOD FOR MAKING

[75] Inventor: Robert E. South, Warsaw, Ind.

[73] Assignee: PVA Unlimited, Warsaw, Ind.

[21] Appl. No.: 806,945

[22] Filed: Feb. 26, 1997

[51] Int. Cl.[6] ..................................................... B32B 5/18
[52] U.S. Cl. .......................... 156/78; 156/245; 264/46.4; 15/119.2; 15/228; 15/244.3; 428/309.9
[58] Field of Search .............................. 156/309.3, 308.6, 156/308.8, 78, 79, 245, 276; 264/46.4; 15/119.2, 228, 244.1, 244.3, 244.4; 428/309.9

[56] References Cited

U.S. PATENT DOCUMENTS

| | | | |
|---|---|---|---|
| 2,948,651 | 8/1960 | Waag | 264/46.4 |
| 3,722,550 | 3/1973 | Matthews | 156/309.3 |
| 4,007,070 | 2/1977 | Busdiecker | 156/309.3 |
| 4,425,396 | 1/1984 | Hartman | 428/309.9 |
| 5,302,225 | 4/1994 | Padden | 156/309.3 |
| 5,401,449 | 3/1995 | Hill et al. | 156/245 |
| 5,578,363 | 11/1996 | Finley et al. | 428/309.9 |

Primary Examiner—Michael W. Ball
Assistant Examiner—Michael A Tolin
Attorney, Agent, or Firm—Wendell E. Miller

[57] ABSTRACT

A method for making an article of manufacture (10 or 34) includes making a PVC structural element (12 or 36) with a surface (26), adhesively securing a sheet of stranded material (22) to the surface (26), and molding a sponge material (16 or 40) to the sheet of stranded material (22). The sheet of stranded material (22) is a woven material or nonwoven mat. Securing the sheet of stranded material (22) to the surface (26) includes chemically softening a layer (18) of the structural element (12 or 36) by applying a solvent, applying a plastic cement layer (20) to the softened layer (18), partially embedding the sheet of stranded material (22) into the layer (20) and/or into the layer (18), thereby at least partially encompassing a plurality of first portions (28) of strands (24), and molding the sponge material (16 or 40) onto the partially-embedded sheet of stranded material (22), thereby at least partially encompassing a plurality of second portions (30) of the strands (24). When a woven material is used, the partial embedding steps result in interposing partially-encompassed first (28) and second (30) portions of the strands (24).

19 Claims, 1 Drawing Sheet

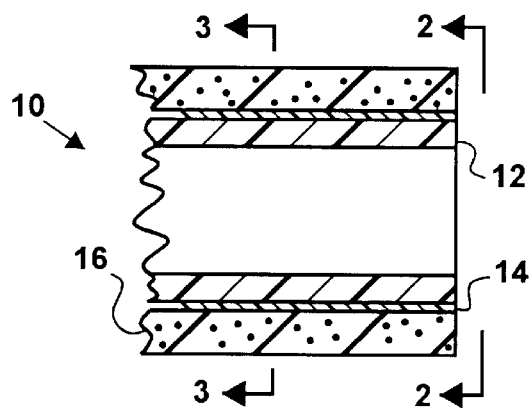
FIG. 1
FIG. 2
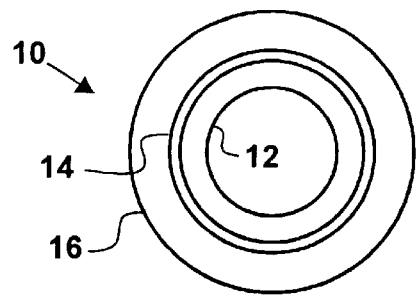
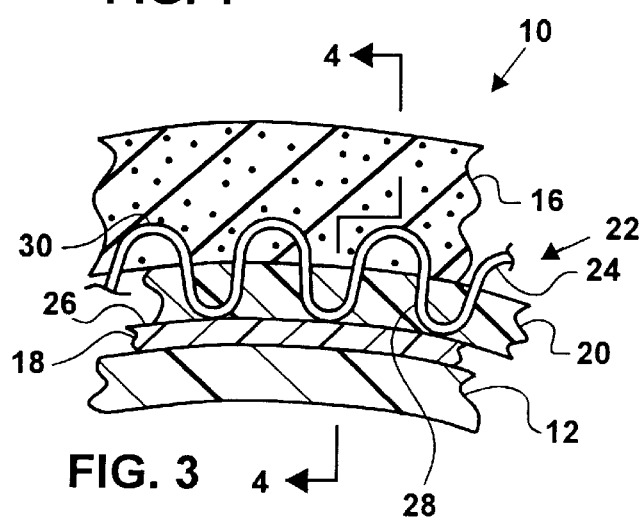
FIG. 3
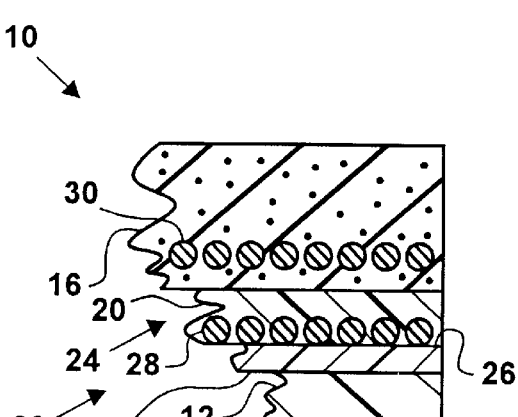
FIG. 4
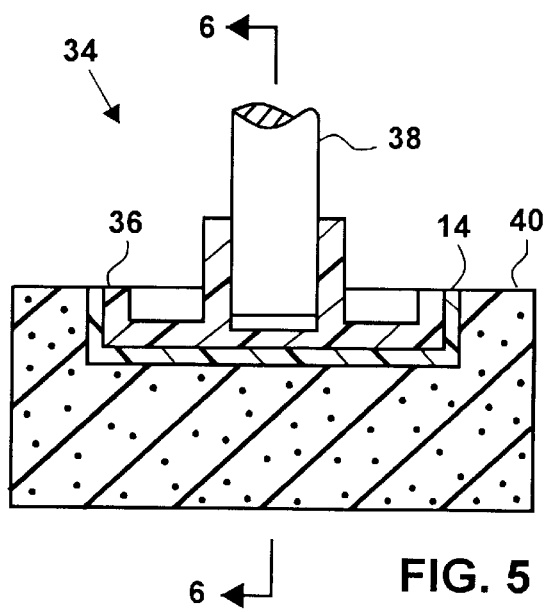
FIG. 5
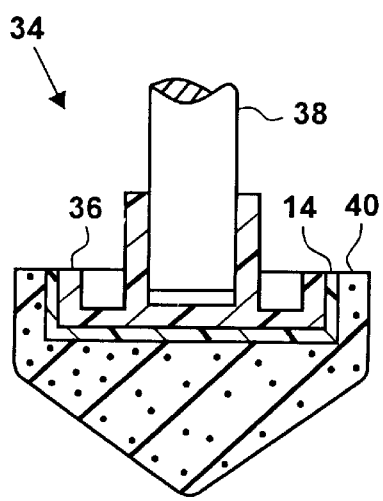
FIG. 6

SPONGE-COVERED ASSEMBLIES AND METHOD FOR MAKING

BACKGROUND OF THE INVENTION

The present invention relates generally to articles of manufacture in which a nonmetallic material is bonded to a structural element having a plastic surface. More particularly, the present invention pertains to sponge-covered assemblies in which polyvinyl alcohol (PVA) foam is bonded to polyvinyl chloride (PVC) structural elements, and to the method for making.

FIELD OF THE INVENTION

DESCRIPTION OF THE RELATED ART

Sponge-covered assemblies have a wide variety of uses in the home, in the store, in the office, and in the factory. Sponge-covered assemblies may be planar, or somewhat planar in shape, or they may be curved or cylindrical. They may be in such forms as pads, mops, or roller assemblies. And they may be hand actuated, or they may be power actuated as a part of a highly automated process.

Whatever the form or intended use, polyvinyl alcohol (PVA), although somewhat more expensive than inferior materials, is a superior material for use in making sponge-covered assemblies. It combines relatively high strength and high resistance to wear with a high capacity to hold water.

Sponge-covered rollers are especially important in automated processes in which water must be removed from a surface, and in which a water-based material is applied. Although polyvinyl alcohol is highly resistant to wear and structural damage, a critical design problem has been providing both durability and reliability in the bond between the sponge material and the roller hub. This problem stems from the fact that the bond between the surface of the roller hub and the sponge roller is subject to stresses that are both repetitive and relatively high.

Cyclic tangential forces, whether unidirectional or bidirectional, produce cyclic shear forces in the bond between the roller hub and the sponge roller. These shear stresses are intensified by elastic deformation of the sponge material.

That is, shear stresses in the bond between the sponge roller and the roller hub are not only a function of the torque caused by tangential forces placed on the peripheral of the sponge roller, they are also a function of elastic deformation of the sponge roller. And, the shear stresses caused by elastic deformation include both radial compression of the sponge roller and tangential deformation, both of which result from working engagement of the sponge roller with a work piece.

SUMMARY OF THE INVENTION

In a preferred embodiment of the present invention, a sponge-covered roller assembly includes a roller hub made from PVC tubing, a stranded material, or stranded sheet, that is bonded to the roller hub, and a PVA sponge roller that is bonded to the stranded material.

The method of the invention includes making a hub from PVC tubing that includes an outer surface, chemically softening the outer surface by applying a solvent, applying a PVC cement to the chemically-softened outer surface, partially embedding a stranded material into the PVC cement, and foam molding a PVA roller to the partially-embedded stranded material.

The stranded material, or stranded bond-sheet, is securely attached to the PVC hub, both chemically and mechanically. And, the PVA sponge is attached mechanically to the stranded material.

With regard to chemical bonding: the PVC cement bonds to the PVC hub because both the hub and the cement are of the same type of plastic, or the PVC cement is compatible with and welds to the PVC hub. Thus, as the solvent evaporates, the PVC hub and the PVC cement form a unitary welded unit.

With regard to the mechanical bond, the PVC cement mechanically adheres to the stranded material. More particularly, a first plurality of spaced-apart portions of a multitude of strands of the stranded material are encased, encompassed, or partially encompassed, by the PVC cement. In like manner, as the polyvinyl alcohol sponge material is molded against the stranded material, the polyvinyl alcohol sponge material encases, encompasses, or partially encompasses, a second plurality of portions of the strands.

That is, a first plurality of spaced-apart portions of the strands are mechanically bonded to the structural element by PVC cement. And a second plurality of spaced-apart portions, that are interposed between respective pairs of the first plurality of portions, are mechanically bonded to the PVA material as the PVA material is molded onto exposed portions of the strands.

In a first aspect of the present invention, a method is provided for making an article of manufacture, which method comprises making a structural element having a surface; adhesively securing a sheet of stranded material to the surface; and foam molding a sponge material to the sheet of stranded material.

In a second aspect of the present invention, a method is provided for making a sponge-covered roller assembly, which method comprises making a roller hub with a surface; chemically softening the surface; applying a liquid adhesive layer to the chemically softened surface; partially embedding a sheet of stranded material into the adhesive layer; and foam molding a sponge roller onto the partially-embedded sheet of stranded material.

In a third aspect of the present invention, a method is provided for making a sponge mop, which method comprises making a mop head with a surface; bonding a sheet of stranded material to the surface; and foam molding a sponge mop pad to strands of the sheet of stranded material.

In a fourth aspect of the present invention, a method is provided for making an article of manufacture, which method comprises making a structural element having a surface; bonding a sheet of stranded material to said surface; and foam molding a sponge material to said sheet of stranded material.

BRIEF DESCRIPTION OF THE DRAWINGS

FIG. 1 is a cross-sectional side elevation of a preferred embodiment of the present invention in which a sponge-covered roller assembly includes a hub and a sponge roller that is attached to the hub by a bonding layer;

FIG. 2 is an end view of the sponge-covered roller assembly of FIG. 1, taken substantially as shown by View Line 2—2 of FIG. 1;

FIG. 3 is a partial and greatly enlarged cross-sectional view of the sponge-covered roller assembly of FIGS. 1 and 2, taken substantially as shown by Section Line 3—3 of FIG. 1, and showing that the bonding layer of FIGS. 1 and 2 includes a chemically softened outer surface, chemical welding of a glue layer to the softened outer surface, and both the encompassing attachment of the stranded material by the glue layer and the encompassing attachment of the stranded material by the sponge material;

FIG. 4 is a partial and greatly enlarged cross-sectional view of the sponge-covered roller assembly of FIGS. 1 and 2, taken substantially as shown by Section Line 4—4 of FIG. 3, and showing that the bonding layer of FIGS. 1 and 2 includes a chemically softened outer surface, chemical welding of a glue layer to the softened outer surface, and both the encompassing attachment of the stranded material by the glue layer and the encompassing attachment of the stranded material by the sponge material;

FIG. 5 is a cross-sectional side elevation of a mop in which a PVA sponge pad is attached to a PVC sponge head by means of a bonding layer; and FIG. 6 is a cross-sectional end elevation of the mop of FIG. 4, taken substantially as shown by View Line 6—6 of FIG. 5.

DESCRIPTION OF THE PREFERRED EMBODIMENTS

Referring now to FIGS. 1–3, a sponge assembly, sponge-covered roller assembly, or article of manufacture, 10 includes a roller hub, polyvinyl chloride tube, or PVC structural element, 12, a bonding layer 14, and a sponge roller, foam rubber layer, polyvinyl alcohol (PVA) sponge material, polyvinyl alcohol sponge element, foamed material, or plastic material, 16. The bonding layer 14 includes a chemically softened PVC layer, or chemically softened surface, 18, a liquid adhesive layer, plastic cement layer, or PVC cement layer, 20, and a sheet of stranded material 22, whether a woven material, a nonwoven mat, or a matted material, which includes strands or fibers 24, as more clearly seen in FIGS. 3 and 4. The sheet 22 is interposed between the roller hub 12 and the sponge roller 16.

Referring now to FIGS. 3 and 4 which are greatly enlarged, the method of the present invention includes applying a solvent, which preferably is a PVC primer, to a cylindrical outer surface 26 of the roller hub 12, thereby producing the softened layer 18. While the softened layer 18 is still in a softened state, the PVC cement layer 20 is applied over the softened layer 18, and then the sheet 22 is pressed down into the softened layer 18 and the PVC cement layer 20.

As the sheet 22 is pressed down into the layers 18 and 20, a first plurality of spaced-apart portions 28 of a multitude of the strands 24 of the sheet of stranded material 22 are encompassed by the PVC cement layer 20. In like manner, as the polyvinyl alcohol sponge material 16 is molded against the sheet of stranded material 22, the polyvinyl alcohol sponge material 16 encompasses, or is foam molded to, a second plurality of spaced-apart portions 30 of the strands 24.

That is, separate ones of the spaced-apart portions 28 are disposed between respective pairs of the spaced-apart portions 30, the portions 28 being bonded by the PVC cement layer 20, and the portions 30 being bonded to the PVA sponge material 16 as the PVA sponge material 16 is molded onto exposed portions 30 of the strands 24.

Continuing to refer to FIG. 3, preferably, the strands 24 are Nylon and they are woven and the sheet 22 is from 0.0405 inches (1.6 mm) to 0.09375 inches (2.6 mm) thick. Alternately, the sheet 22 could be woven from plastic strands or fibers, or polyesters or polypropylenes.

Screen materials, whether made of plastic or metal strands, may be used for the sheet 22. However, since sulfuric acid is used in the PVA molding process, the material that is used for the strands 24 must be resistant to this acid.

Although PVC is the preferred material for the structural element 12, whether solid or merely including a PVC surface, and while PVC solvent and PVC cement are preferred, any suitable plastic material, any suitable solvent for the plastic, and any suitable cement may be used to practice the present invention. Further, although the sheet 22 preferably is woven, the sheet 22 may be made by any process in which mechanical bonding secures the sheet 22 to the structural element 12 and in which mechanical bonding also secures the sponge material 16 to the sheet 22.

Referring now to FIGS. 5 and 6, in a second preferred embodiment, a sponge assembly, or sponge mop, or article of manufacture, 34 includes a mop head, or plastic base plate, or structural element, 36 that is molded from polyvinyl chloride, a mop handle 38, and a sponge mop pad, or sponge material, 40. The method of attaching the sponge mop pad 40 to the mop head 36 includes the bonding layer 14 as has been described in conjunction with FIGS. 1–4.

While polyvinyl chloride has been specified as a preferred material for the structural elements 12 and 36, any suitable thermosetting plastic or thermoplastic may be used to practice the present invention. For instance, suitable materials may be selected from the group of vinyl resins produced by polymerization of ethylene derivatives such as vinyl chloride, vinyl acetate, or vinylidene chloride.

With regard to the chemical softening step, any suitable solvent may be used. Generally speaking, the solvent should be one that is recommended for solvent bonding of the particular thermoplastic. For instance, polyvinyl chloride is commonly solvent bonded by solutions containing ketones such as methyl ethyl ketone. With regard to cements used to practice the present invention, methyl ethyl ketone is commonly used in cements for polyvinyl chloride.

Having shown and described the present invention in relation to sponge-covered rollers and sponge-covered mops, it becomes apparent that the process of the present invention can be used to make sponge assemblies for nearly any conceivable use.

While specific apparatus and method have been disclosed in the preceding description, and while part numbers have been inserted parenthetically into some of the claims to facilitate understanding thereof, it should be understood that these specifics have been given for the purpose of disclosing the principles of the present invention and that many variations thereof will become apparent to those who are versed in the art. Therefore, the scope of the present invention is to be determined by the appended claims, and without any limitation by the part numbers inserted parenthetically in the claims.

Industrial Applicability

The present invention is applicable to making assemblies in which one plastic material is molded against, and attached to, another plastic material. Further, the present invention is applicable to making sponge-covered assemblies by attaching sponge materials, whether in roller or pad form, to plastic, or plastic-coated structural elements. The sponge-covered assemblies are usable for hand, machine, or automated operations for picking up or laying down any suitable liquid or liquid-based material.

What is claimed is:

1. A method for making an article of manufacture, which method comprises:

a) making a structural element having a surface;

b) adhesively securing a sheet of stranded material to said surface; and c) foam molding a sponge material to said sheet of stranded material.

2. A method as claimed in claim 1 in which said step of adhesively securing said sheet of stranded material comprises adhesively securing a woven material.

3. A method as claimed in claim 1 in which said step of adhesively securing said sheet of stranded material comprises adhesively securing matted material that includes strands.

4. A method as claimed in claim 1 in which:

a) said adhesive securing step comprises chemically softening said surface;

b) said adhesive securing step further comprises applying a liquid adhesive to said softened surface; and c) said adhesive securing step still further comprises partially embedding said sheet of stranded material into said adhesive layer.

5. A method as claimed in claim 4 in which:

a) said step of making said structural element comprises making said element from thermoplastic; and b) said chemical softening step comprises applying a solvent to said thermoplastic.

6. A method as claimed in claim 4 in which:

a) said step of making said structural element comprises making said element from a polymerized ethylene derivative; and b) said chemical softening step comprises applying a ketone to said polymerized ethylene derivative.

7. A method as claimed in claim 4 in which:

a) said step of making said structural element comprises making said element from the group that includes polyvinyl chloride and chlorinated polyvinyl chloride; and b) said chemical softening step comprises applying a solvent to said structural element.

8. A method as claimed in claim 1 in which:

a) said step of adhesively securing said sheet of stranded material to said surface comprises partially encompassing a first plurality of portions of strands of said sheet; and b) said foam molding of said sponge material to said sheet of stranded material comprises partially encompassing a second plurality of portions of said strands.

9. A method as claimed in claim 1 in which:

a) said step of adhesively securing said sheet of stranded material to said surface comprises partially encompassing a first plurality of spaced-apart portions of strands of said sheet; and b) said foam molding of said sponge material to said sheet of stranded material comprises partially encompassing a second plurality of space-apart portions of said strands that are interspersed between respective pairs of said first plurality of spaced-apart portions with said sponge material.

10. A method as claimed in claim 1 in which:

a) said step of making said structural element with said surface comprises making said element from a polymerized ethylene derivative;

b) said step of adhesively adhering comprises chemically softening said surface;

c) said chemical softening step comprises applying a ketone to said polymerized ethylene derivative;

d) said adhesive securing step further comprises applying a liquid adhesive layer to said softened surface;

e) said step of adhesively securing still further comprises partially embedding said sheet of stranded material into said adhesive layer;

f) said step of adhesively securing yet further comprises partially encompassing a first plurality of spaced-apart portions of strands of said sheet; and g) said foam molding of said sponge material to said sheet of stranded material comprises partially encompassing a second plurality of spaced-apart portions of said strands that are interspersed between respective pairs of said first plurality of spaced-apart portions with said sponge material.

11. A method for making a sponge-covered roller assembly, which method comprises:

a) making a roller hub with a surface;

b) chemically softening said surface;

c) applying a liquid adhesive layer to said chemically softened surface;

d) partially embedding a sheet of stranded material into said adhesive layer; and e) foam molding a sponge roller onto said partially-embedded sheet of stranded material.

12. A method as claimed in claim 11 in which:

a) said step of partially embedding said sheet of stranded material into said adhesive layer comprises partially encompassing a first plurality of spaced-apart portions of strands of said sheet; and b) said molding of said sponge roller onto said partially-embedded sheet of stranded material comprises partially encompassing a second plurality of spaced-apart portions of said strands that are interspersed between respective pairs of said first plurality of spaced-apart portions.

13. A method as claimed in claim 12 in which:

a) said step of making said roller hub with said surface comprises making a roller hub from polyvinyl chloride;

b) said step of chemically softening said surface comprises applying a solvent; and c) said step of applying said liquid adhesive layer to said chemically softened surface comprises applying a polyvinyl chloride cement.

14. A method for making a sponge mop, which method comprises:

a) making a mop head with a surface;

b) bonding a sheet of stranded material to said surface; and c) foam molding a sponge mop pad to strands of said sheet of stranded material.

15. A method as claimed in claim 14 in which:

a) said step of making said mop head with said surface comprises making a plastic base plate;

b) said bonding step comprises chemically softening said surface;

c) said bonding step further comprises applying a liquid adhesive layer to said chemically softened surface;

d) said bonding step still further comprises partially embedding said sheet of stranded material into said liquid adhesive layer; and e) said foam-molding step comprises foam molding polyvinyl alcohol to strands of said partially-embedded sheet.

16. A method as claimed in claim 1 in which said foam molding step comprises foam molding polyvinyl alcohol.

17. A method as claimed in claim 4 in which said foam molding step comprises foam molding polyvinyl alcohol.

18. A method as claimed in claim 13 in which said molding step comprises foam molding polyvinyl alcohol.

19. A method for making an article of manufacture, which method comprises:

a) making a structural element having a surface;

b) bonding a sheet of stranded material to said surface; and c) foam molding a sponge material to said sheet of stranded material.

* * * * *

UNITED STATES PATENT AND TRADEMARK OFFICE
CERTIFICATE OF CORRECTION

PATENT NO. : 5,855,708
DATED : 5 January 1999
INVENTOR(S) : Robert E. South

It is certified that error appears in the above-indentified patent and that said Letters Patent is hereby corrected as shown below:

In column 3, --a-- should be inserted between "hub," and "polyvinyl" in line 23. In Claim 4, --layer-- should be inserted between "adhesive" and "to" in line 17. In Claim 9, "space-apart" should be --spaced-apart-- in line 54.

Signed and Sealed this

Twenty-ninth Day of June, 1999

Attest:

Q. TODD DICKINSON

*Attesting Officer*     *Acting Commissioner of Patents and Trademarks*